US010691640B1

(12) United States Patent
Yang

(10) Patent No.: US 10,691,640 B1
(45) Date of Patent: Jun. 23, 2020

(54) STORING AN ASSET UPDATE RECORD

(71) Applicant: Alibaba Group Holding Limited, George Town (KY)

(72) Inventor: Xinying Yang, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/790,628

(22) Filed: Feb. 13, 2020

Related U.S. Application Data

(63) Continuation of application No. PCT/CN2020/072004, filed on Jan. 14, 2020.

(30) Foreign Application Priority Data

Apr. 18, 2019 (CN) .......................... 2019 1 0314544

(51) Int. Cl.
*G06F 17/30* (2006.01)
*G06F 16/13* (2019.01)
*G06F 16/17* (2019.01)
*G06F 16/182* (2019.01)
*H04L 9/32* (2006.01)
*G06F 21/62* (2013.01)
*H04L 9/06* (2006.01)
*G06F 11/30* (2006.01)

(52) U.S. Cl.
CPC ........ *G06F 16/137* (2019.01); *G06F 11/3034* (2013.01); *G06F 16/1734* (2019.01); *G06F 16/1824* (2019.01); *G06F 21/6218* (2013.01); *H04L 9/0637* (2013.01); *H04L 9/3239* (2013.01)

(58) Field of Classification Search
None
See application file for complete search history.

(56) References Cited

U.S. PATENT DOCUMENTS

| 2017/0046526 | A1* | 2/2017 | Chan ..................... G06Q 20/065 |
| 2017/0279801 | A1* | 9/2017 | Andrade ............. H04L 63/0861 |
| 2018/0337781 | A1* | 11/2018 | Frankel ............... H04L 63/0428 |
| 2019/0132131 | A1* | 5/2019 | Clements ................ G06F 21/31 |
| 2019/0199700 | A1* | 6/2019 | Abramowitz ........... H04L 9/006 |
| 2019/0273616 | A1* | 9/2019 | Bres ...................... H04L 9/3236 |

OTHER PUBLICATIONS

Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.

* cited by examiner

*Primary Examiner* — Hung D Le
(74) *Attorney, Agent, or Firm* — Fish & Richardson P.C.

(57) ABSTRACT

Disclosed herein are computer-implemented methods; computer-implemented systems; and non-transitory, computer-readable media for storing an asset update record. One of the computer-implemented methods includes receiving an asset update record associated with the user. In response to determining one or more conditions of forming a data block are met, an Nth data block of a data block chaining ledger is generated, where the Nth data block comprises a first hash value and the asset update record. A second hash value of the asset update record is calculated. The first hash value and the second hash value are sent to the client device to be stored by the client device.

24 Claims, 5 Drawing Sheets

STORING AN ASSET UPDATE RECORD

CROSS-REFERENCE TO RELATED APPLICATIONS

This application is a continuation of PCT Application No. PCT/CN2020/072004, filed on Jan. 14, 2020, which claims priority to Chinese Patent Application No. 201910314544.8, filed on Apr. 18, 2019, and each application is hereby incorporated by reference in its entirety.

TECHNICAL FIELD

Implementations of the present specification relate to the field of information technology, and in particular, to a method, system, apparatus, and device for storing a personal asset change record.

BACKGROUND

It is common for individual users or family members to configure personal assets through clients. Asset change records are usually stored on a server, and users can query the corresponding personal asset change records from the server.

For users, asset configuration is a transaction with a server owner, and these asset change records are usually stored on the server. Users hope that personal data stored on the server cannot be tampered with, and users can verify at any time whether the data is modified.

Based on this, a solution for storing a personal asset change record that cannot be tampered with in a centralized scenario is needed.

SUMMARY

An objective of implementations of the present application is to provide a solution for storing a personal asset change record that cannot be tampered with in a centralized scenario.

To alleviate the previous technical problem, the implementations of the present application are implemented as follows:

A method for storing a personal asset change record is provided and applied to a system including a database server and a client, where the database server stores a personal asset change record in a centralized way by using a blockchain-type ledger that stores data based on a blockchain data structure (e.g., in a form of a blockchain), and the method includes: obtaining, by the client, a personal asset change record, and sending the personal asset change record to the database server; receiving, by the database server, the to-be-stored personal asset change record, and when a predetermined blocking condition is met, determining at least one personal asset change record to be written into a data block to generate an Nth data block in the blockchain-type ledger, where the data block includes a hash value of the Nth data block and the personal asset change record: when N=1, a hash value and a block height of an initial data block are given based on a predetermined method; and when N>1, the hash value of the Nth data block is determined based on the personal asset change record to be written into the data block and a hash value of an (N−1)th data block, to generate the Nth data block that includes the hash value of the Nth data block and the personal asset change record, where block heights of data blocks are increased monotonically based on a sequence of blocking moments; determining, by the database server, a hash value of a personal asset change record written into the data block, and returning the hash value to the client; and receiving and storing, by the client, the returned hash value of the personal asset change record and the hash value of the data block.

Correspondingly, an implementation of the present specification further provides a system for storing a personal asset change record. The system includes a database server and a client, and the database server stores a personal asset change record in a centralized way by using a blockchain-type ledger.

In the system, the client obtains a personal asset change record, and sends the personal asset change record to the database server; the database server receives the to-be-stored personal asset change record, and when a predetermined blocking condition is met, determines at least one personal asset change record to be written into a data block to generate an Nth data block in the blockchain-type ledger, where the data block includes a hash value of the Nth data block and the personal asset change record: when N=1, a hash value and a block height of an initial data block are given based on a predetermined method; and when N>1, the hash value of the Nth data block is determined based on the personal asset change record to be written into the data block and a hash value of an (N−1)th data block, to generate the Nth data block that includes the hash value of the Nth data block and the personal asset change record, where block heights of data blocks are increased monotonically based on a sequence of blocking moments; the database server determines a hash value of a personal asset change record written into the data block, and returns the hash value to the client; and the client receives and stores the returned hash value of the personal asset change record and the hash value of the data block.

Correspondingly, an implementation of the present specification further provides a method for storing a personal asset change record, where the method is applied to a database server and the method includes: receiving a to-be-stored personal asset change record sent by a client; when a predetermined blocking condition is met, determining at least one personal asset change record to be written into a data block to generate an Nth data block in a blockchain-type ledger, where the data block includes a hash value of the Nth data block and the personal asset change record: when N=1, a hash value and a block height of an initial data block are given based on a predetermined method; and when N>1, the hash value of the Nth data block is determined based on the personal asset change record to be written into the data block and a hash value of an (N−1)th data block, to generate the Nth data block that includes the hash value of the Nth data block and the personal asset change record, where block heights of data blocks are increased monotonically based on a sequence of blocking moments; determining a hash value of a personal asset change record written into the data block, and returning the hash value to the client.

Correspondingly, an implementation of the present specification further provides an apparatus for storing a personal asset change record, where the apparatus is applied to a database server and the apparatus includes: a receiving module, configured to receive a to-be-stored personal asset change record sent by a client; a data block generation module, configured to: when a predetermined blocking condition is met, determine at least one personal asset change record to be written into a data block to generate an Nth data block in a blockchain-type ledger, where the data block includes a hash value of the Nth data block and the personal asset change record: when N=1, a hash value and a block height of an initial data block are given based on a predetermined method; and when N>1, the hash value of the Nth data block is determined based on the personal asset change record to be written into the data block and a hash value of an (N−1)th data block, to generate the Nth data block that includes the hash value of the Nth data block and the personal asset change record, where block heights of data blocks are increased monotonically based on a sequence of blocking moments; a hash returning module, configured to determine a hash value of a personal asset change record written into the data block, and return the hash value to the client.

According to the solution provided in this implementation of the present specification, the server stores the user-related asset change record by using the blockchain-type ledger, and the user holds the hash value of the asset change record. Therefore, the asset change record can be queried and verified at any time based on the hash value, thereby ensuring that the asset change record of the user is not tampered with, ensuring integrity of the record, and improving user experience.

It should be understood that the previous general description and the following detailed description are merely examples and explanations, and cannot limit the implementations of the present specification.

In addition, any of the implementations in the present specification does not need to achieve all the previous effects.

BRIEF DESCRIPTION OF DRAWINGS

To describe the technical solutions in some implementations of the present specification or in the existing technology more clearly, the following briefly describes the accompanying drawings needed for describing the implementations or the existing technology. Apparently, the accompanying drawings in the following description merely show some implementations of the present specification, and a person of ordinary skill in the art can still derive other drawings from these accompanying drawings.

DESCRIPTION OF IMPLEMENTATIONS

To make a person skilled in the art better understand the technical solutions in the implementations of the present specification, the following describes in detail the technical solutions in the implementations of the present specification with reference to the accompanying drawings in the implementations of the present specification. Apparently, the described implementations are merely some but not all of the implementations of the present specification. All other implementations obtained by a person of ordinary skill in the art based on the implementations of the present specification shall fall within the protection scope of the present specification.

At present, a user can perform, by using a client, asset-related behaviors such as payments and loans, and corresponding asset change records are generated at the same time. On one hand, the generated asset change records are fragmented, dispersed in time, and in different formats. It is inconvenient for the user to perform centralized management. For example, the user has a loan record in HUABEI and fixed investment in Yu'E Bao. The user gets a daily earning from Yu'E Bao and performs daily payment via ALIPAY. These cause asset changes of the user. On the other hand, when these asset changes happen, they are either related to a server (for example, payment) or the server has a direct interest relationship with the changes (for example, borrowing behavior), and the asset change records are also stored on the server. Based on this, the present specification provides a solution for storing a personal asset change record that cannot be tampered with in a centralized scenario.

Figure 1:
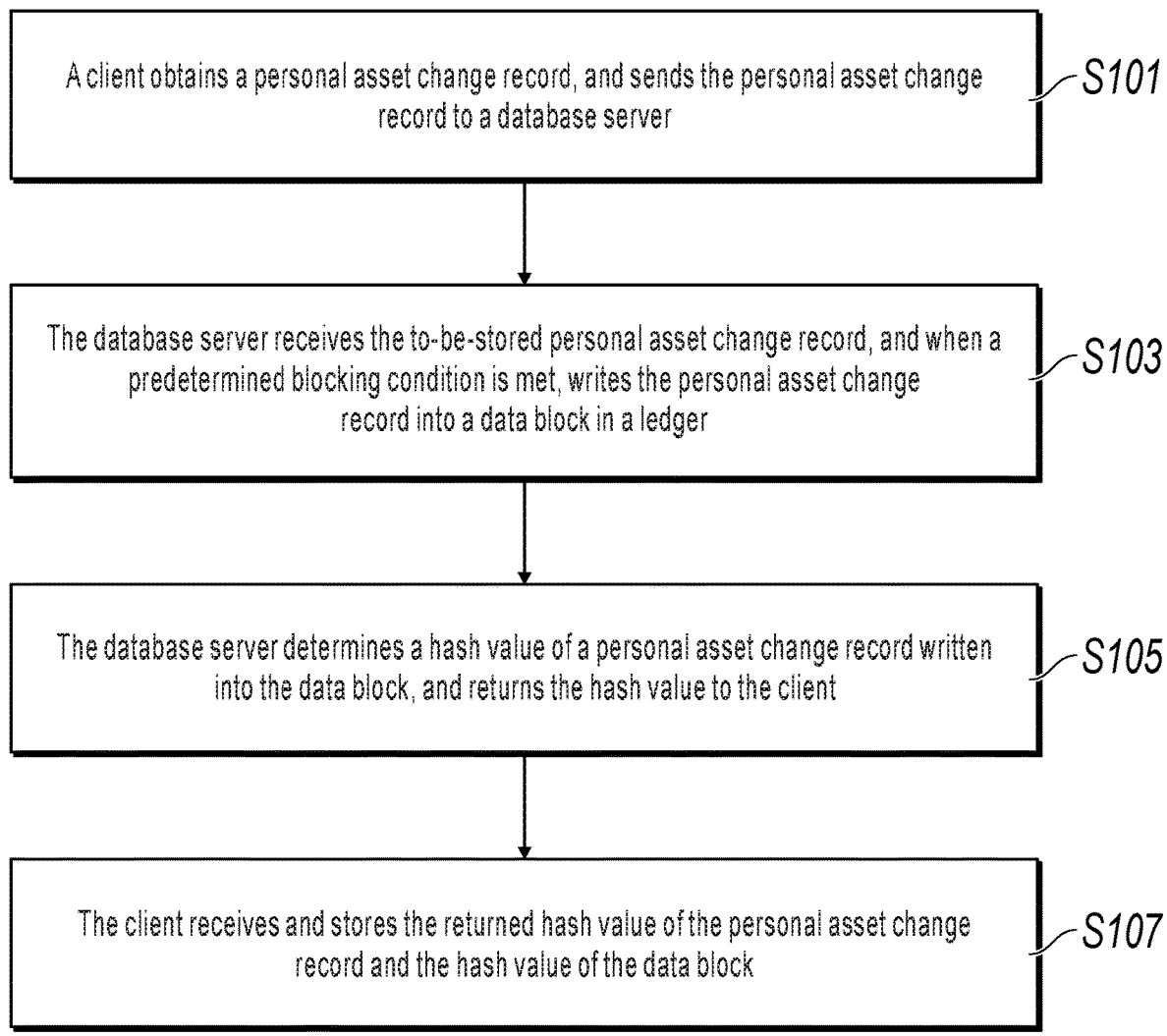
FIG. 1 is a schematic flowchart illustrating a personal asset change record in a system, according to an implementation of the present specification.

The technical solutions provided in the implementations of the present specification are described in detail below with reference to the accompanying drawings. FIG. 1 is a schematic flowchart illustrating a personal asset change record, according to an implementation of the present specification. The personal asset change record is applied to a system that includes a database server and a client. The database server stores the personal asset change record in a centralized way by using a blockchain-type ledger. The process includes the following steps:

S101. The client obtains a personal asset change record, and sends the personal asset change record to the database server.

The personal asset change record can be a payment record, a transfer/collection record, a borrowing/repayment record, a financial product delivery record, a reconciliation record, etc.

It is worthwhile to note that the personal asset change record can be one record. For example, user A purchases a fund by using the client to obtain a delivery record of the fund. Or the personal asset change record can include multiple records. For example, user A performs multiple operations on a fund owned by user A in multiple consecutive days by using the client, and one delivery record is generated each day. The client packages the delivery records in the multiple days together and uploads them as the personal asset change records.

In an implementation, the client can select a specified personal asset change record based on a user instruction, that is, obtain the personal asset change record based on a manual operation of the user.

In an implementation, the client can monitor the account balance of the user, and when detecting that the balance is changed, the client obtains a related transaction that causes the balance to change, and then obtains a corresponding personal asset change record.

Specifically, the user can determine, through pre-configuration on the client, a type of personal asset change record that needs to be written into the ledger, and the specified personal asset change record will be automatically obtained and uploaded to the database server.

For example, for a certain user, a daily payment record for daily consumption, a cash earning record for a financial product, a delivery record for a financial product, a borrowing record of a credit card, etc. can be generated via the client. In practice, the user pays much attention to the delivery record for the financial product and the borrowing record of the credit card that have a relatively large amount of money, so the user can select and upload only the two types of personal asset change records via the client. Therefore, the ledger better meets the user's expectations, thereby improving user experience.

S103. The database server receives the to-be-stored personal asset change record, and when a predetermined blocking condition is met, writes the personal asset change record into a data block in the ledger.

The ledger is the blockchain-type ledger, and the data block can include both a block header and a block body. The block body is used to store the personal asset change record, and the block header is used to store related metadata of the data block. The metadata includes a root hash of a Merkle tree that corresponds to the personal asset change record in the block body, a hash of a previous data block, a hash of the data block itself, an ledger version, etc.

The predetermined blocking condition includes: The number of to-be-stored personal asset change records reaches a number threshold. For example, each time 10 personal asset change records are received, one new data block is generated, and the 10 personal asset change records are written into the block. Or a time interval between a previous blocking moment and a current moment reaches a time threshold. For example, one new data block is generated every other hour, and a personal asset change record received within one hour is written into the block.

N refers to a serial number of a data block. In other words, in this implementation of the present specification, data blocks are arranged in a form of blockchain and in a sequence of blocking moments, and have a strong time sequence characteristic. Block heights of the data blocks are monotonically increased based on a sequence of blocking moments. The block height can be a sequence number, and in this case, the block height of an Nth data block is N. The block height can also be generated in another way. For example, based on symmetric encryption of blocking moments, large integer data of 12 to 15 bits is generated as the block height.

When N=1, the data block is an initial data block (which can also be referred to as a genesis block). A hash value and a block height of the initial data block are given based on a predetermined method. For example, the initial data block does not include a personal asset change record, a hash value is any given hash value, and a block height blknum=0. For another example, a trigger condition for generating the initial data block is consistent with a trigger condition for another data block, but the hash value of the initial data block is determined by hashing all content in the initial data block. For another example, the initial data block includes related information (for example, a user identifier, including an identity card number, a client account number, and a mobile phone number) of a creator (that is, a user having an operation permission for the ledger), and the hash value of the initial data block is obtained by hashing the related information.

When N>1, because content and a hash value of a previous data block are determined, a hash value of a current data block (the Nth data block) can be generated based on the hash value of the previous data block (that is, the (N−1)th data block). For example, in a feasible method, hash values of each personal asset change record to be written into the Nth block are determined, and a Merkle tree is generated based on an arrangement sequence of the personal asset change records in the block. A root hash value of the Merkle tree is combined with the hash value of the previous data block to generate the hash value of the current data block by using a hash algorithm. For another example, a hash value of the entire personal asset change record can be obtained by performing combination and hashing based on the sequence of personal asset change records in the block. The hash value of the entire personal asset change record is combined with the hash value of the previous data block to obtain a character string. A hash operation is performed on the character string to generate the hash value of the data block.

In the previous data block generation method, each data block is determined by using a hash value, and the hash value of the data block is determined by content and a sequence of personal asset change records in the data block, and a hash value of a previous data block. The user can initiate verification at any time based on the hash value of the data block. Modification to any content in the data block (including the content or the sequence of personal asset change records in the data block) causes a difference between a hash value of the data block calculated during verification and a hash value of the data block during generation, which causes a verification failure, thereby avoiding tampering in the centralized scenario.

S105. The database server determines a hash value of a personal asset change record written into the data block, and returns the hash value to the client.

When the personal asset change record uploaded by the client is written into the ledger, the hash value of the data block written into the ledger is determined. Here, a granularity of the personal asset change record is the same as a granularity of the personal asset change record uploaded by the client. That is, for each uploaded personal asset change record, a corresponding hash value needs to be returned, and a block hash and a block height of a data block that the personal asset change record is located can also be returned, so the user can perform verification.

A hash value of a data block that a personal asset change record is located can also be queried based on a hash value of the personal asset change record.

S107. The client receives and stores the returned hash value of the personal asset change record and the hash value of the data block.

According to the solution provided in this implementation of the present specification, the server stores the user-related asset change record by using the blockchain-type ledger, and the user holds the hash value of the asset change record. Therefore, the asset change record can be queried and verified at any time based on the hash value, thereby ensuring that the asset change record of the user is not tampered with, ensuring integrity of the record, and improving user experience.

In an implementation, the amount of money can further be configured on the client, so when obtaining the personal asset change record of the user, the client can filter out some records with a relatively small amount of money.

A specific configuration method can be that a default value of an asset change threshold is given on the client, and the default value is usually 0, that is, any personal asset change record will be written into the ledger. The user can set the asset change threshold. For example, if the user configures an asset change threshold of 1000 Yuan, usually daily payment records will not be written into the ledger.

In an implementation, the client can also assess the user's historical average asset amount to determine the asset change threshold. For example, the user sets the asset change threshold to 1% of the average asset amount. The historical average asset amount can be obtained by assessing a daily asset amount in the client of the user within a historical time period (for example, last year) and averaging daily assessment values.

In an implementation, the generated ledger can correspond to multiple users. For example, before the initial data block is generated, the user of the client specifies and authorizes other members (e.g., a family member, a friend, a partner, etc.) to enable multiple users to share one ledger. That is, the user specified when the initial data block is generated has at least access permission to the ledger. A user who initiates generation of the ledger by using the client has the administrator right, and the administrator right includes: deleting/hiding the ledger, configuring access permission for the ledger, configuring another user's right, etc.

Further, in this case, the administrator right can be granted to multiple users, and information about users that correspond to the ledger (for example, a client account number of each user and a personal identity card number of each user) is written into the initial data block. A hash value of the initial data block is calculated based on the information about the users related to the ledger, which is equivalent to that evidences are stored in the initial data block.

Figure 2:
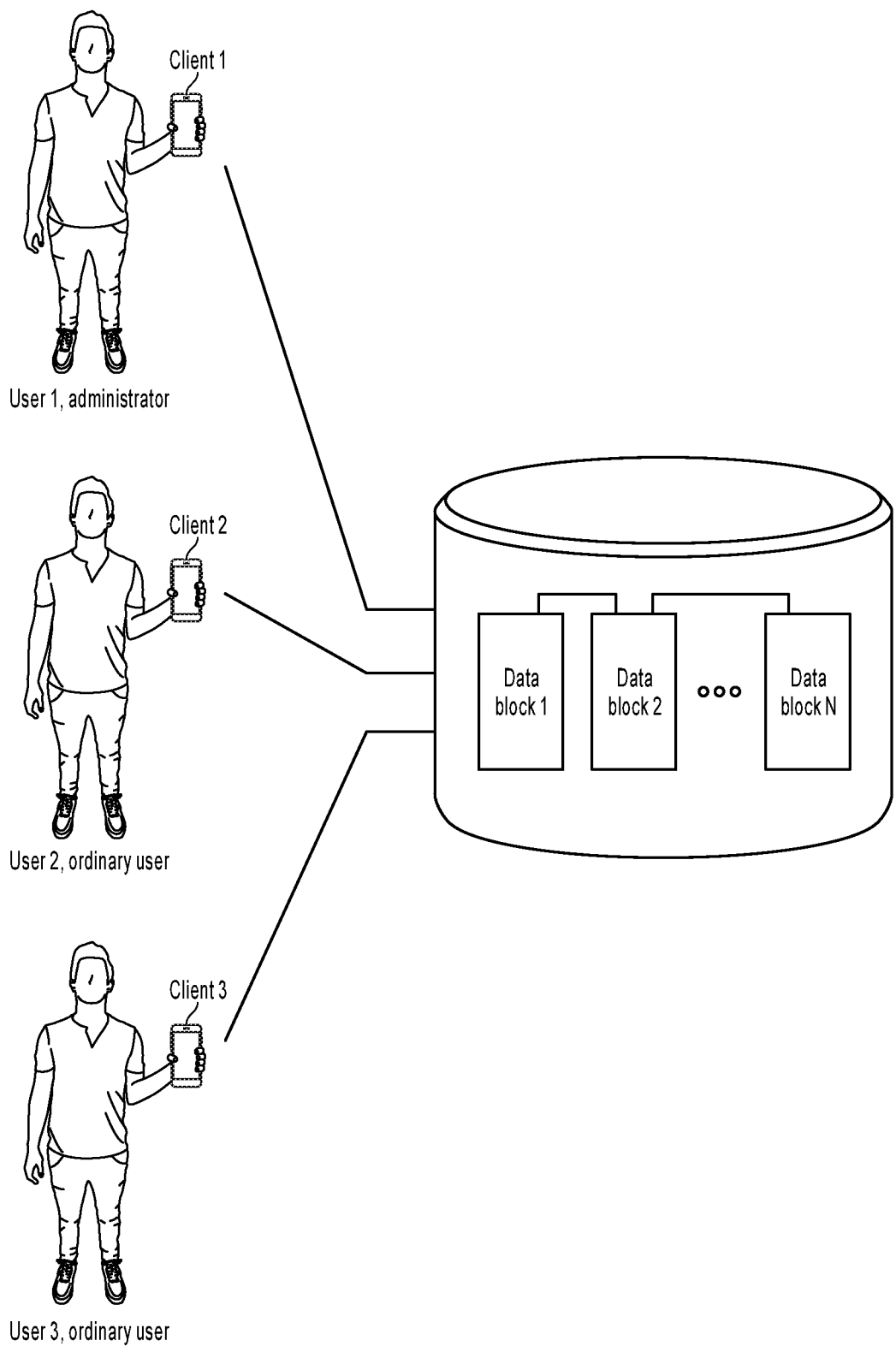
FIG. 2 is a schematic diagram illustrating using the same ledger by multiple users, according to an implementation of the present specification.

For a common ledger of multiple users, each user can obtain an asset change record by using the user's client, and send the asset change record to the same ledger. As such, the generated ledger corresponds to records of a common asset of the multiple users. When writing a personal asset change record, the server sends a hash value of the personal asset record to a client of each administrator user of the ledger. FIG. 2 is a schematic diagram illustrating using the same ledger by multiple users, according to an implementation of the present specification.

After the personal asset change record is written into the ledger, the client can query and verify the ledger at any time based on the hash value. A specific query method can be implemented by using a query instruction. The query instruction needs to include only a to-be-queried hash value entered by the user. The hash value here can be a hash value of a personal asset change record or a hash value of a data block in the ledger, and the database server can perform a traversal query in data blocks, or can query in a pre-established index.

The following provides several example query methods in the implementations of the present specification:

Method 1: Enter a hash value of a personal asset change record, and return a block height of a data block that the personal asset change record is located and an offset in the data block. A query instruction SELECT (khash, &v, FULL) can be used for implementation.

Method 2: Enter a hash value of a data block, and return plaintexts of all personal asset change records in the data block. Or enter a hash value of a personal asset change record, and return a plaintext of the personal asset change record. A query instruction SELECT (khash, &v) can be used for implementation. When receiving a corresponding query instruction, the database server executes the previous query logic based on the hash value to return a result.

Method 3: Enter a hash value of a data block, and return a block height based on the block hash value. A query instruction SELECT (khash, &v, BLK) can be used for implementation.

Certainly, there can be a case that a user enters a hash value, and a server cannot identify a corresponding result through query. For example, the user enters a hash value that corresponds to a personal asset change record, and a result cannot be queried in the database. In this case, the user can reasonably suspect that the personal asset change record that corresponds to the hash has changed, can be tampered with, or can be lost.

In addition to the query, the user can further initiate verification on multiple existing data blocks or personal asset change records in the database. The user can initiate a verification instruction. In the verification instruction, parameters are used to specify which data blocks or personal asset change records in the ledger need to be verified. For example, a hash value or a block height can be used to specify one data block, and whether multiple data blocks before or after the data block are correct is verified. Or a hash value is used to specify a corresponding personal asset change record, to verify whether the personal asset change record exists in the database. A verification result is "yes" or "no" and metadata such as "correct" or "incorrect". The following provides several example verification methods in the implementations of the present specification:

Method 1: Enter a hash value to determine a data block by using the hash value, and verify the data block to obtain a verification result. A verification instruction VERIFY ('khash', &v) can be used for implementation.

Method 2: Enter a hash value to determine, based on the hash value, a corresponding data block or a data block that a personal asset change record that corresponds to the hash value is located, and perform verification forward starting from the determined data block to the initial data block. A verification instruction VERIFY ('khash', &v, −1) can be used for implementation. Generally, an initial block height is "0" or "1". Therefore, −1 can be another value less than the initial block height.

Method 3: Enter a hash value to determine a corresponding data block by using the hash value, and verify forward a specified number of data blocks starting from the determined data block. A verification instruction VERIFY ('khash', &v, blknum) can be used for implementation.

Method 4: Enter a block height and the number of data blocks that need to be verified to verify forward a specified number of data blocks starting from a data block that corresponds to the block height. A verification instruction VERIFY (blkh, &v, blknum) can be used for implementation.

In a specific verification method, a user provides a hash value that corresponds to a personal asset change record in a data block (which usually is a hash value returned by the server when the personal asset change record is written into the ledger, or can be a hash value calculated by the user), and a root hash of a Merkle tree in the data block is reconstructed based on the hash value of the personal asset change record. If the root hash of the reconstructed Merkle tree is the same as a root hash in a previously stored data block, it indicates that the personal asset change record that corresponds to the hash exists in the ledger.

A method for verifying a data block in the ledger is recalculating a hash value of the data block based on a hash value of a previous data block and a personal asset change record included in the data block, and comparing the recalculated hash value with a previously stored hash value of the data block. If the hash values are consistent, verification succeeds.

In an implementation, verification can be performed on the server. In addition, the client can obtain all information in the ledger based on a query instruction. Therefore, the client can perform verification locally after obtaining all the information in the ledger.

It is worthwhile to note that when multiple users use the same ledger, an administrator right can be used to perform query or verification, and an administrator user can configure the right of another user. For example, another non-administrator user can also perform query and verification, but cannot delete the ledger.

Correspondingly, an implementation of the present specification further provides a system for storing a personal asset change record. The system includes a database server and a client, and the database server stores a personal asset change record in a centralized way by using a blockchain-type ledger.

In the system, the client obtains a personal asset change record, and sends the personal asset change record to the database server; the database server receives the to-be-stored personal asset change record, and when a predetermined blocking condition is met, determines at least one personal asset change record to be written into a data block to generate an Nth data block in the blockchain-type ledger, where the data block includes a hash value of the Nth data block and the personal asset change record: when N=1, a hash value and a block height of an initial data block are given based on a predetermined method; and when N>1, the hash value of the Nth data block is determined based on the personal asset change record to be written into the data block and a hash value of an (N−1)th data block, to generate the Nth data block that includes the hash value of the Nth data block and the personal asset change record, where block heights of data blocks are increased monotonically based on a sequence of blocking moments; the database server determines a hash value of a personal asset change record written into the data block, and returns the hash value to the client; and the client receives and stores the returned hash value of the personal asset change record and the hash value of the data block.

Further, in the system, the client monitors an account balance of a user, and when the balance changes, obtains a personal asset change record related to the change of the balance; or the client obtains a pre-specified type of personal asset change record, where the pre-specified type of personal asset change record includes at least one of a payment record, a transfer/collection record, a borrowing/repayment record, a financial product delivery record, and a reconciliation record.

Further, in the system, the client obtains a personal asset change record whose change value exceeds a predetermined asset change threshold.

Further, in the system, the client receives a user operation instruction, and obtains an asset change threshold specified by a user; or obtains a historical average asset amount of a user, and determines the predetermined asset change threshold based on the historical average asset amount.

Further, in the system, the client determines a user and a permission of the blockchain-type ledger, where the user of the ledger includes at least a user that corresponds to the client, and the user that corresponds to the client has an administrator right; and correspondingly, obtaining, by the client, a personal asset change record, and sending the personal asset change record to the database server includes: obtaining, by a client that corresponds to the user of the blockchain-type ledger, the personal asset change record, and sending the personal asset change record to the database server.

Further, in the system, the predetermined blocking condition includes at least one of: the number of to-be-stored service logs reaches a number threshold; or a time interval between a previous blocking moment and a current moment reaches a time threshold.

Further, in the system, the client sends a query request that includes a hash value to the database server; and the database server queries and obtains a corresponding personal asset change record in the ledger based on the hash value, and returns the personal asset change record to the client.

Further, in the system, the client sends a verification request that includes a hash value to the database server; and the database server receives the verification request to verify integrity of a personal asset change record that corresponds to the hash value in the blockchain-type ledger, and returns a verification result.

Figure 3:
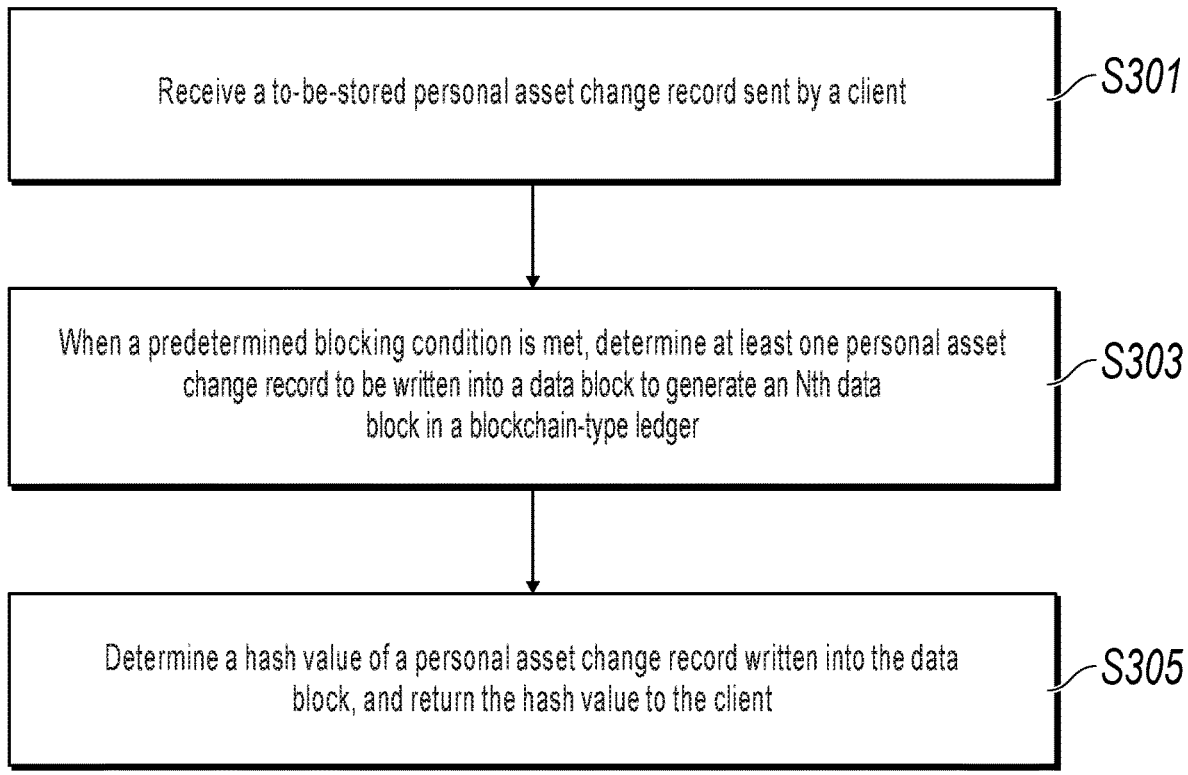
FIG. 3 is a schematic flowchart illustrating a method for storing a personal asset change record on a server, according to an implementation of the present specification.

Correspondingly, an implementation of the present specification further provides a method for storing a personal asset change record. The method is applied to a database server. FIG. 3 is a schematic flowchart illustrating a method for storing a personal asset change record, according to an implementation of the present specification. The method includes:

S301. Receive a to-be-stored personal asset change record sent by a client.

S303. When a predetermined blocking condition is met, determine at least one personal asset change record to be written into a data block to generate an Nth data block in a blockchain-type ledger, where the data block includes a hash value of the Nth data block and the personal asset change record: when N=1, a hash value and a block height of an initial data block are given based on a predetermined method; and when N>1, the hash value of the Nth data block is determined based on the personal asset change record to be written into the data block and a hash value of an (N−1)th data block, to generate the Nth data block that includes the hash value of the Nth data block and the personal asset change record, where block heights of data blocks are increased monotonically based on a sequence of blocking moments.

S305. Determine a hash value of a personal asset change record written into the data block, and return the hash value to the client.

Figure 4:
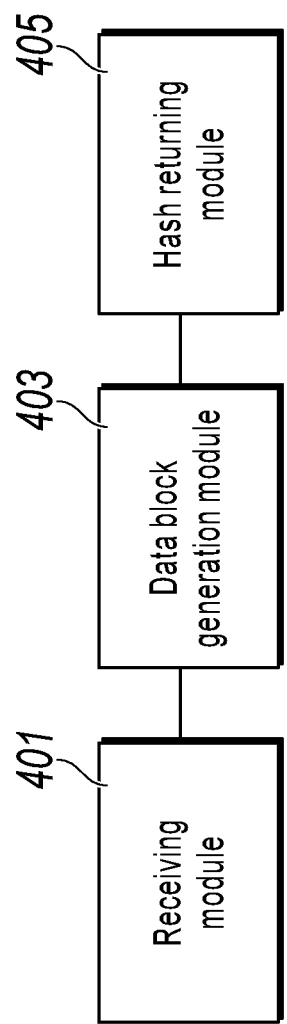
FIG. 4 is a schematic structural diagram illustrating an apparatus for storing a personal asset change record on a server, according to an implementation of the present specification.

Correspondingly, an implementation of the present specification further provides an apparatus for storing a personal asset change record. The apparatus is applied to a database server. FIG. 4 is a schematic structural diagram illustrating an apparatus for storing a personal asset change record, according to an implementation of the present specification. The apparatus includes: a receiving module 401, configured to receive a to-be-stored personal asset change record sent by a client; a data block generation module 403, configured to: when a predetermined blocking condition is met, determine at least one personal asset change record to be written into a data block to generate an Nth data block in a blockchain-type ledger, where the data block includes a hash value of the Nth data block and the personal asset change record: when N=1, a hash value and a block height of an initial data block are given based on a predetermined method; and when N>1, the hash value of the Nth data block is determined based on the personal asset change record to be written into the data block and a hash value of an (N−1)th data block, to generate the Nth data block that includes the hash value of the Nth data block and the personal asset change record, where block heights of data blocks are increased monotonically based on a sequence of blocking moments; a hash returning module 405, configured to determine a hash value of a personal asset change record written into the data block, and return the hash value to the client.

An implementation of the present specification further provides a computer device. The computer device includes at least a memory, a processor, and a computer program that is stored in the memory and that can run on the processor. When executing the program, the processor implements the method for storing a personal asset change record shown in FIG. 3.

Figure 5:
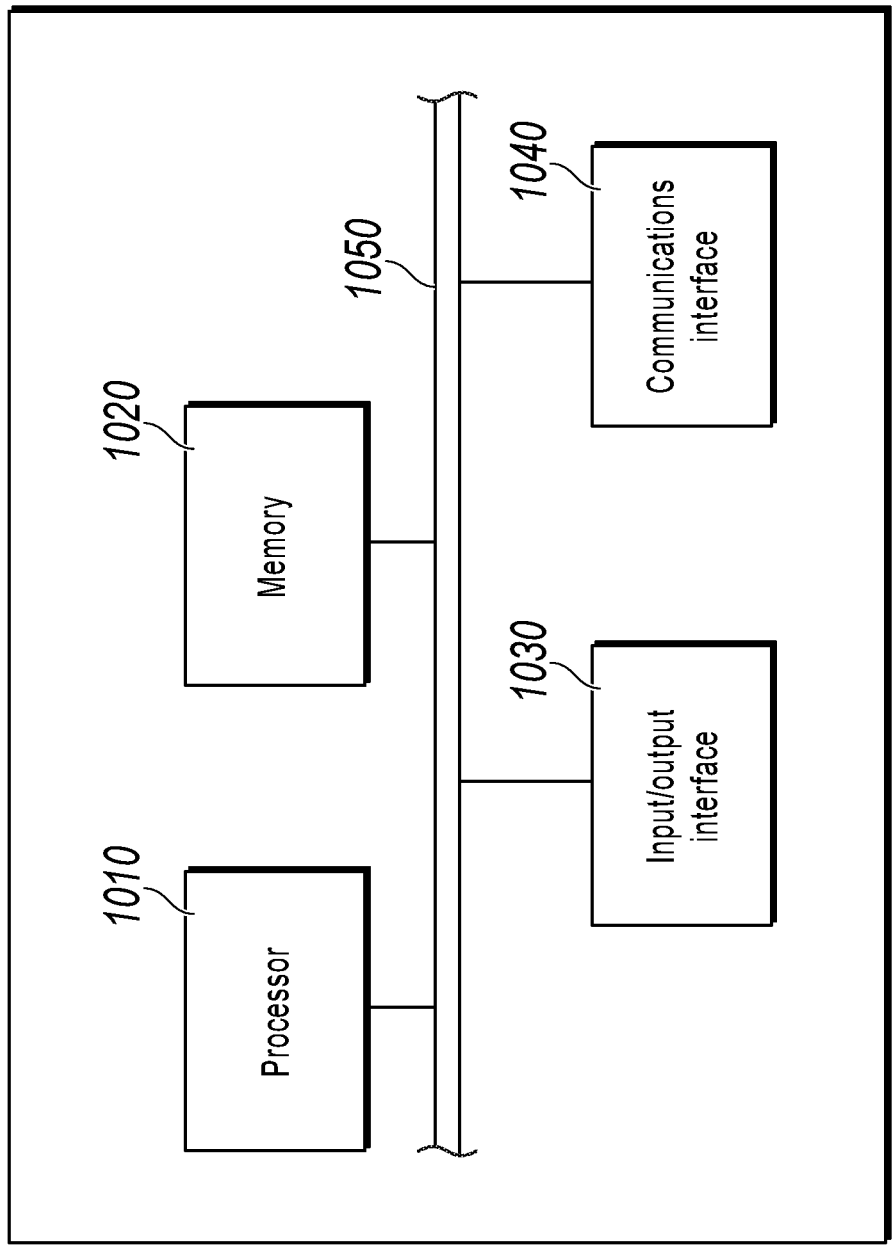
FIG. 5 is a schematic structural diagram illustrating a device used to configure a method in an implementation of the present specification.

FIG. 5 is a more detailed schematic diagram illustrating a hardware structure of a computing device, according to an implementation of the present specification. The device can include a processor 1010, a memory 1020, an input/output interface 1030, a communications interface 1040, and a bus 1050. The processor 1010, the memory 1020, the input/output interface 1030, and the communications interface 1040 are communicatively connected to each other inside the device by using the bus 1050.

The processor 1010 can be implemented by using a general central processing unit (CPU), a microprocessor, an application-specific integrated circuit (ASIC), one or more integrated circuits, etc., and is configured to execute a related program, so as to implement the technical solutions provided in the implementations of the present specification.

The memory 1020 can be implemented by using a read-only memory (ROM), a random access memory (RAM), a static storage device, a dynamic storage device, etc. The memory 1020 can store an operating system and another application program. When the technical solutions provided in the implementations of the present specification are implemented by using software or firmware, related program code is stored in the memory 1020, and is invoked and executed by the processor 1010.

The input/output interface 1030 is configured to be connected to an input/output module, to input or output information. The input/output module (not shown in the figure) can be used as a component and configured in the device, or can be externally connected to the device, to provide a corresponding function. The input module can include a keyboard, a mouse device, a touchscreen, a microphone, various sensors, etc. The output module can include a monitor, a speaker, a vibrator, an indicator, etc.

The communications interface 1040 is configured to be connected to a communications module (not shown in the figure), to implement a communication interaction between the device and another device. The communications module can perform communication in a wired way (for example, USB or a network cable), or can perform communication in a wireless way (for example, a mobile network, Wi-Fi, or Bluetooth).

The bus 1050 includes one channel, used to transmit information between components (for example, the processor 1010, the memory 1020, the input/output interface 1030, and the communications interface 1040) of the device.

It is worthwhile to note that although only the processor 1010, the memory 1020, the input/output interface 1030, the communications interface 1040, and the bus 1050 of the device are shown, during specific implementation, the device can further include other components needed for implementing normal running. In addition, a person skilled in the art can understand that the device can include only components necessary for implementing the solutions in the implementations of the present specification, but does not necessarily include all components shown in the figure.

An implementation of the present specification further provides a computer readable storage medium on which a computer program is stored. When being executed by a processor, the program implements the method for storing a personal asset change record shown in FIG. 3.

The computer readable medium includes persistent, non-persistent, movable, and unmovable media that can store information by using any method or technology. The information can be a computer readable instruction, a data structure, a program module, or other data. Examples of the computer storage medium include but are not limited to a phase change random access memory (PRAM), a static RAM (SRAM), a dynamic RAM (DRAM), a RAM of another type, a read-only memory (ROM), an electrically erasable programmable ROM (EEPROM), a flash memory or another memory technology, a compact disc ROM (CD-ROM), a digital versatile disc (DVD), or another optical storage, a cassette, a cassette magnetic disk storage, or another magnetic storage device or any other non-transmission medium. The computer storage medium can be configured to store information that can be accessed by a computing device. As described in the present application, the computer readable medium does not include computer readable transitory media such as a modulated data signal and a carrier.

It can be seen from the previous descriptions of the implementations that, a person skilled in the art can clearly understand that the implementations of the present specification can be implemented by using software and a necessary general hardware platform. Based on such an understanding, the technical solutions in the implementations of the present specification essentially or the part contributing to the existing technology can be implemented in a form of a software product. The computer software product can be stored in a storage medium, such as a ROM/RAM, a magnetic disk, or an optical disc, and includes several instructions for instructing a computer device (which can be a personal computer, a server, a network device, etc.) to perform the method described in the implementations of the present specification or in some parts of the implementations of the present specification.

The system, method, module, or unit illustrated in the previous implementations can be implemented by using a computer chip or an entity, or can be implemented by using a product having a certain function. A typical implementation device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

The implementations in the present specification are described in a progressive way. For same or similar parts of the implementations, references can be made to the implementations mutually. Each implementation focuses on a difference from other implementations. Particularly, an equipment implementation is similar to a method implementation, and therefore is described briefly. For a related part, references can be made to some descriptions in the method implementation. The previously described device implementations are merely examples. The modules described as separate parts can or cannot be physically separate. During implementation of the solutions in the implementations of the present application, functions of the modules can be implemented in one or more pieces of software and/or hardware. Some or all of the modules can be selected based on an actual need to implement the solutions of the implementations. A person of ordinary skill in the art can understand and implement the implementations of the present specification without creative efforts.

The previous descriptions are merely specific implementations of the implementations of the present application. It is worthwhile to note that a person of ordinary skill in the art can further make several improvements or polishing without departing from the principle of the implementations of the present application, and the improvements or polishing shall fall within the protection scope of the implementations of the present application.

What is claimed is:

1. A computer-implemented method for storing an asset update record, comprising:
   receiving, by a database server from a client device associated with a user, an asset update record associated with the user;
   in response to determining one or more conditions of forming a data block are met, generating, by the database server, an Nth data block of a data block chaining ledger, wherein the Nth data block comprises a first hash value and the asset update record, and wherein:
      when N=1, the Nth data block is a genesis data block and the first hash value is a hash value of the Nth data block; and
      when N>1, the first hash value is determined based on the asset update record and a hash value of an (N−1)th data block;
   calculating, by the database server, a second hash value of the asset update record; and
   sending, by the database server, the first hash value and the second hash value to the client device to be stored by the client device.

2. The computer-implemented method according to claim 1, wherein the asset update record is obtained by the client device by monitoring one or more of a payment record, balance transfer record, lending record, repayment record, brokerage account record, reconciliation record, and account balance record associated with the user.

3. The computer-implemented method according to claim 1, wherein the asset update record is obtained by the client device when a value of a corresponding asset of the user has changed by an amount exceeding a predetermined threshold.

4. The computer-implemented method according to claim 3, wherein the predetermined threshold is specified by the user or calculated based on an average asset value of the user during a predetermined period of time.

5. The computer-implemented method according to claim 1, the method further comprises:
   receiving, by the database server, one or more asset update records from one or more client devices associated with one or more users of the data block chaining ledger, wherein the user is included in the one or more users of the data block chaining ledger and has a user right as an administrator.

6. The computer-implemented method according to claim 1, wherein the one or more conditions of forming a data block comprises one or more of a volume of data received by the database server has met a predetermined threshold and a predetermined time has lapsed after a last data block is formed.

7. The computer-implemented method according to claim 1, further comprising:
   receiving, by the database server from the client device, an asset update record query that comprises a hash value;
   identifying, by the database server, an asset update record that has a hash value equal to the hash value; and
   sending, by the database server, the asset update record to the client device in response to the asset update record.

8. The computer-implemented method according to claim 1, further comprising:
   receiving, by the database server from the client device, a verification request that comprises a hash value; and
   identifying, by the database server, an asset update record that has a hash value equal to the hash value; and
   sending, by the database server, a confirmation to the client device indicating an integrity of a corresponding asset update record in the data block chaining ledger.

9. A computer-implemented system for storing an asset update record, comprising:
   one or more computers; and
   one or more computer memory devices interoperably coupled with the one or more computers and having tangible, non-transitory, machine-readable media storing one or more instructions that, when executed by the one or more computers, perform operations comprising:
      receiving, by a database server from a client device associated with a user, an asset update record associated with the user;
      in response to determining one or more conditions of forming a data block are met, generating, by the database server, an Nth data block of a data block chaining ledger, wherein the Nth data block comprises a first hash value and the asset update record, and wherein:
         when N=1, the Nth data block is a genesis data block and the first hash value is a hash value of the Nth data block; and
         when N>1, the first hash value is determined based on the asset update record and a hash value of an (N−1)th data block;
      calculating, by the database server, a second hash value of the asset update record; and
      sending, by the database server, the first hash value and the second hash value to the client device to be stored by the client device.

10. The computer-implemented system according to claim 9, wherein the asset update record is obtained by the client device by monitoring one or more of a payment record, balance transfer record, lending record, repayment record, brokerage account record, reconciliation record, and account balance record associated with the user.

11. The computer-implemented system according to claim 9, wherein the asset update record is obtained by the client device when a value of a corresponding asset of the user has changed by an amount exceeding a predetermined threshold.

12. The computer-implemented system according to claim 11, wherein the predetermined threshold is specified by the user or calculated based on an average asset value of the user during a predetermined period of time.

13. The computer-implemented system according to claim 9, the operations further comprising:
   receiving, by the database server, one or more asset update records from one or more client devices associated with one or more users of the data block chaining ledger, wherein the user is included in the one or more users of the data block chaining ledger and has a user right as an administrator.

14. The computer-implemented system according to claim 9, wherein the one or more conditions of forming a data block comprises one or more of a volume of data received by the database server has met a predetermined threshold and a predetermined time has lapsed after a last data block is formed.

15. The computer-implemented system according to claim 9, the operations further comprising:
   receiving, by the database server from the client device, an asset update record query that comprises a hash value;

identifying, by the database server, an asset update record that has a hash value equal to the hash value; and sending, by the database server, the asset update record to the client device in response to the asset update record.

16. The computer-implemented system according to claim 9, the operations further comprising:

receiving, by the database server from the client device, a verification request that comprises a hash value; and identifying, by the database server, an asset update record that has a hash value equal to the hash value; and sending, by the database server, a confirmation to the client device indicating an integrity of a corresponding asset update record in the data block chaining ledger.

17. A non-transitory, computer-readable medium storing one or more instructions executable by a computer system to perform operations for storing an asset update record, comprising:

receiving, by a database server from a client device associated with a user, an asset update record associated with the user;

in response to determining one or more conditions of forming a data block are met, generating, by the database server, an Nth data block of a data block chaining ledger, wherein the Nth data block comprises a first hash value and the asset update record, and wherein:

when N=1, the Nth data block is a genesis data block and the first hash value is a hash value of the Nth data block; and when N>1, the first hash value is determined based on the asset update record and a hash value of an (N−1)th data block;

calculating, by the database server, a second hash value of the asset update record; and sending, by the database server, the first hash value and the second hash value to the client device to be stored by the client device.

18. The non-transitory, computer-readable medium according to claim 17, wherein the asset update record is obtained by the client device by monitoring one or more of a payment record, balance transfer record, lending record, repayment record, brokerage account record, reconciliation record, and account balance record associated with the user.

19. The non-transitory, computer-readable medium according to claim 17, wherein the asset update record is obtained by the client device when a value of a corresponding asset of the user has changed by an amount exceeding a predetermined threshold.

20. The non-transitory, computer-readable medium according to claim 17, wherein a predetermined threshold is specified by the user or calculated based on an average asset value of the user during a predetermined period of time.

21. The non-transitory, computer-readable medium according to claim 19, the operations further comprising:

receiving, by the database server, one or more asset update records from one or more client devices associated with one or more users of the data block chaining ledger, wherein the user is included in the one or more users of the data block chaining ledger and has a user right as an administrator.

22. The non-transitory, computer-readable medium according to claim 17, wherein the one or more conditions of forming a data block comprises one or more of a volume of data received by the database server has met a predetermined threshold and a predetermined time has lapsed after a last data block is formed.

23. The non-transitory, computer-readable medium according to claim 17, the operations further comprising:

receiving, by the database server from the client device, an asset update record query that comprises a hash value;

identifying, by the database server, an asset update record that has a hash value equal to the hash value; and sending, by the database server, the asset update record to the client device in response to the asset update record.

24. The non-transitory, computer-readable medium according to claim 17, the operations further comprising:

receiving, by the database server from the client device, a verification request that comprises a hash value; and identifying, by the database server, an asset update record that has a hash value equal to the hash value; and sending, by the database server, a confirmation to the client device indicating an integrity of a corresponding asset update record in the data block chaining ledger.

* * * * *